United States Patent [19]

Baars et al.

[11] Patent Number: 4,594,970
[45] Date of Patent: Jun. 17, 1986

[54] MARINE INSTALLATION INCLUDING FUEL/OIL MIXING DEVICE

[75] Inventors: William W. Baars, Kenosha, Wis.; Gaylord M. Borst, Highland Park, Ill.; J. Michael Mahoney, Bristol, Wis.

[73] Assignee: Outboard Marine Corporation, Waukegan, Ill.

[21] Appl. No.: 700,550

[22] Filed: Feb. 11, 1985

[51] Int. Cl.⁴ .............................................. F02B 33/04
[52] U.S. Cl. ............................ 123/73 AD; 123/196 R
[58] Field of Search ............ 123/73 AD, 73 R, 196 R

[56] References Cited

U.S. PATENT DOCUMENTS

| | | | |
|---|---|---|---|
| Re. 29,193 | 4/1973 | Carlyle | 137/99 |
| 1,996,080 | 4/1933 | Pitt | 184/7 |
| 2,775,944 | 1/1957 | Ryder et al. | |
| 2,789,510 | 4/1957 | Meynig | |
| 2,862,478 | 12/1958 | Staats | |
| 2,935,057 | 5/1960 | Perlewitz | 123/73 AD |
| 2,938,509 | 5/1960 | Carbonero | 123/73 AD |
| 3,330,211 | 7/1967 | Faro et al. | 103/6 |
| 3,434,490 | 3/1969 | Lyall | 137/101.31 |
| 3,481,318 | 12/1969 | Sparow et al. | 137/99 |
| 3,630,642 | 12/1971 | Osterman | 417/245 |
| 3,653,784 | 4/1972 | Leiterman et al. | 123/73 AD |
| 3,765,802 | 10/1973 | Leitman et al. | 417/395 |
| 3,893,203 | 7/1975 | Berkelius | |
| 3,913,551 | 10/1975 | Shaver | 123/73 AD |
| 3,937,241 | 2/1976 | Cloup | 137/99 |
| 3,963,038 | 6/1976 | Jensen | 137/99 |
| 3,976,040 | 8/1976 | Goggi | 123/73 AD |
| 4,142,486 | 3/1979 | Schreier | 123/73 AD |
| 4,165,756 | 8/1979 | Tucker | 137/99 |
| 4,262,710 | 4/1981 | Nomure et al. | 123/73 AD |
| 4,381,741 | 5/1983 | Walsworth | 123/73 AD |
| 4,383,504 | 5/1983 | Walsworth | 123/73 AD |
| 4,388,896 | 6/1983 | Sheridan et al. | 123/73 AD |
| 4,471,728 | 9/1984 | Borst | 123/73 AD |
| 4,473,340 | 9/1984 | Walsworth | 123/73 AD |
| 4,539,949 | 9/1985 | Walsworth | 123/73 AD |
| 4,555,221 | 11/1985 | DuBois | 417/349 |

Primary Examiner—E. Rollins Cross
Attorney, Agent, or Firm—Michael, Best & Friedrich

[57] ABSTRACT

A marine installation comprising a marine propulsion device including a propulsion unit having a lower unit supporting a propeller and a powerhead including a two-stroke internal combustion engine having an apparatus for feeding a fuel/oil mixture to the engine and including a fuel/oil mixture pump having an inlet and being operable to create suction at the inlet, a flexible hose releasably connected to and communicating with the inlet of the fuel/oil mixture pump, and a remote tank having an interior providing a fuel reservoir, having a fitting releasably connected to the flexible hose, having a top wall including a first opening which is adapted to afford filling of fuel into the interior of the tank and which is adapted to removably receive a cap covering the first opening, and a second opening spaced from the first opening, and having an oil storing, oil pumping and fuel/oil mixing device located in the tank and including an upper wall closing the second opening and being secured to the top wall of the tank, and having therein an opening which is adapted to afford filling of oil into the oil storing, oil pumping, and fuel/oil mixing device and which is adapted to removably receive a cap covering the opening in the upper wall, an endless wall depending into the tank from the upper wall to partially define an oil reservoir communicating with the upper wall opening, and an oil pumping and fuel/oil mixing apparatus secured to the depending wall to form the bottom of the oil reservoir and including a first inlet communicating with the oil reservoir, a second inlet communicating with the fuel reservoir, and an outlet communicating with the fitting.

65 Claims, 15 Drawing Figures

MARINE INSTALLATION INCLUDING FUEL/OIL MIXING DEVICE

BACKGROUND OF THE INVENTION

The invention relates generally to means for feeding a fuel/oil mixture to an internal combustion engine and particularly to means for feeding a fuel/oil mixture to the carburetor of a marine propulsion device such as an outboard motor or a stern drive unit.

Still more particularly, the invention relates to portable fuel tanks and to means for pumping oil and fuel from a remote portable or fixed fuel tank to a marine propulsion unit.

Present day portable fuel tanks include a fitting which is detachably connectable to a flexible suction line or hose which, in turn, is detachably connected to the inlet of a fuel pump which is commonly actuated by pulsating crankcase pressure. The negative and positive pressures created by such a fuel pump are, respectively, generally sufficient to lift the fuel/oil mixture through the hose and from the oil/fuel tank and to deliver the fuel/oil mixture to the carburetor of the marine propulsion device.

It is also noted that it is generally desirable to separately supply fuel and oil to separate fuel and oil reservoirs and to mix the fuel and oil in a predetermined proportion as compared to simply filling both fuel and oil into a single fuel/oil mixture storage tank.

Attention is directed to the following prior art U.S. patents:

Pitt U.S. Pat. No. 1,996,080, Apr. 2, 1935; Ryder, et al. U.S. Pat. No. 2,775,944, Jan. 1, 1957; Meynig U.S. Pat. No. 2,789,510, Apr. 23, 1957; Staats U.S. Pat. No. 2,862,478, Dec. 2, 1958; Perlewitz U.S. Pat. No. 2,935,057, May 3, 1960; Carbonero U.S. Pat. No. 2,938,509, May 31, 1960; Lyall U.S. Pat. No. 3,434,490, Mar. 25, 1969; Sparrow, et al. U.S. Pat. No. 3,481,318, Dec. 2, 1969; Osterman U.S. Pat. No. 3,630,642, Dec. 28, 1971; Leitermann, et al. U.S. Pat. No. 3,653,784, Apr. 4, 1972; Leitermann, et al. U.S. Pat. No. 3,765,802, Oct. 16, 1973; Berkelius U.S. Pat. No. 3,893,203, July 8, 1975; Shaver U.S. Pat. No. 3,913,551, Oct. 21, 1975; Cloup U.S. Pat. No. 3,937,241, Feb. 10, 1976; Jensen U.S. Pat. No. 3,963,038, June 15, 1976; Schreier U.S. Pat. No. 4,142,486, Mar. 6, 1979; Tucker U.S. Pat. No. 4,165,759, Aug. 28, 1979; Nomure, et al. U.S. Pat. No. 4,262,710, Apr. 21, 1981; Carlyle U.S. Pat. No. Re.29,193, Apr. 26, 1977.

Attention is also directed to the following U.S. patents assigned to the assignee of this application:

Walsworth U.S. Pat. No. 4,381,741, May 3, 1983; Walsworth U.S. Pat. No. 4,473,340, Sept. 25, 1984; Walsworth U.S. Pat. No. 4,383,504, May 17, 1983; Borst U.S. Pat. No. 4,471,728, Sept. 18, 1984.

Attention is also directed to the following pending U.S. applications assigned to the assignee of this application:

Walsworth Ser. No. 410,497, Aug. 23, 1982; Borst Ser. No. 464,197, Feb. 7, 1983.

Holterman application entitled "Oil Metering Device for Supplying Oil to a Fuel Tank", Ser. No. 687,870, filed Dec. 21, 1984.

SUMMARY OF THE INVENTION

The invention provides a marine installation comprising a marine propulsion device including a propulsion unit having a lower unit supporting a propeller and a powerhead including a two-stroke internal combustion engine having means for feeding a fuel/oil mixture to the engine and including a fuel/oil mixture pump having an inlet and being operable to create suction at the inlet, a flexible hose releasably connected to and communicating with the inlet of the fuel/oil mixture pump, and a remote tank having an interior providing a fuel reservoir, having a fitting releasably connected to the flexible hose, having a top wall including a first opening which is adapted to afford filling of fuel into the interior of the tank and which is adapted to removably receive a cap covering the first opening, and a second opening spaced from the first opening, and having an oil storing, oil pumping and fuel/oil mixing device located in the tank and including an upper wall closing the second opening and being secured to the top wall of the tank, and having therein an opening which is adapted to afford filling of oil into the oil storing, oil pumping, and fuel/oil mixing device and which is adapted to removably receive a cap covering the opening in the upper wall, an endless wall depending into the tank from the upper wall to partially define an oil reservoir communicating with the upper wall opening, and an oil pumping and fuel/oil mixing apparatus secured to the depending wall to form the bottom of the oil reservoir and including a first inlet communicating with the oil reservoir, a second inlet communicating with the fuel reservoir, and an outlet communicating with the fitting.

The invention also provides a marine installation comprising a boat hull, a stern drive unit supported by the boat hull and including a lower unit located exteriorly of the boat hull and supporting a propeller, and a four-stroke internal combustion engine located interiorly of the boat hull and including means for feeding fuel to the four-stroke engine and including a fuel pump operable to create suction, a remote fuel tank located in the boat hull and having an interior providing a fuel reservoir communicating with the fuel pump, an outboard motor located exteriorly of the boat hull and including a propulsion unit having a lower unit supporting a propeller, and a powerhead including a two-stroke internal combustion engine including means for feeding a fuel/oil mixture to the two-stroke engine and including a fuel/oil mixture pump operable to create a suction, and an oil storing, oil pumping and fuel/oil mixing device supported on the boat hull in spaced relation from the remote fuel tank and including an upper wall having therein an opening which is adapted to afford filling of oil into the oil storing, oil pumping, and fuel/oil mixing device and which is adapted to removably receive a cap covering the opening in the upper wall, an endless wall depending from the upper wall to partially define an oil reservoir communicating with the upper wall opening, and an oil pumping and fuel/oil mixing apparatus secured to the depending wall to form the bottom of the oil reservoir and including a first inlet communicating with the oil reservoir, a second inlet communicating with the fuel reservoir, and an outlet communicating with the fuel/oil pump.

The invention also provides a fuel feeding system comprising an assembly for separately storing fuel and oil, for pumping oil, and for mixing the fuel and oil, which assembly comprises a tank having an interior providing a fuel reservoir, having a top wall including a first opening which is adapted to afford filling of fuel into the interior of the tank and which is adapted to removably receive a cap covering the first opening, and having a second opening spaced from the first opening, an oil storing, oil pumping, and fuel/oil mixing device located in the tank and including an upper wall closing the second opening and being secured to the top wall of the tank, and having therein an opening which is adapted to afford filling of oil into the oil storing, oil pumping, and fuel/oil mixing device and which is adapted to removably receive a cap covering the opening in the upper wall, an endless wall depending into the tank from the upper wall and extending to adjacent the bottom of the tank to partially define an oil reservoir communicating with the upper wall opening, and an oil pumping and fuel/oil mixing apparatus secured to the depending wall to form the bottom of the oil reservoir and including a first inlet communicating with the oil reservoir, a second inlet communicating with the fuel reservoir, and an outlet, and means communicating with the outlet and operable to create a suction applied to the outlet.

The invention also provides an assembly for separately storing fuel and oil, for pumping oil, and for mixing the fuel and oil, which assembly comprises a tank including an interior providing a fuel reservoir, having a top wall including a first opening which is adapted to afford filling of fuel into the interior of the tank and which is adapted to removably receive a cap covering the first opening, and having a second opening spaced from the first opening, a fitting on the tank, and an oil storing, oil pumping, and fuel/oil mixing device located in the tank and including an upper wall closing the second opening of the tank, and having therein an opening which is adapted to afford filling of oil into the oil storing, oil pumping, and fuel/oil mixing device and which is adapted to removably receive a cap covering the opening in the upper wall, an endless wall depending into the tak from the upper wall to partially define an oil reservoir communicating with the upper wall opening, and an oil pumping and fuel/oil mixing apparatus secured to depending wall to form the bottom of the oil reservoir and including a first inlet communicating with the oil reservoir, a second inlet communicating with the fuel reservoir, and an outlet communicating with the fitting.

The invention also provides an oil storing, oil pumping, and fuel/oil mixing device including an upper wall having therein an opening which is adapted to afford filling of oil into the oil storing, oil pumping, and fuel/oil mixing device and which is adapted to removably receive a cap covering the opening in the upper wall, an endless wall depending from the upper wall to partially define an oil reservoir communicating with the upper wall opening, and an oil pumping and fuel/oil mixing apparatus secured to the depending wall to form the bottom of the oil reservoir and including a first inlet communicating with the oil reservoir, a second inlet adapted to communicate with a cource of fuel, and an outlet for delivering the fuel/oil mixture.

Other features and advantages of the embodiments of the invention will become known by reference to the following general description, claims and appended drawings.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Figures 1, 4:
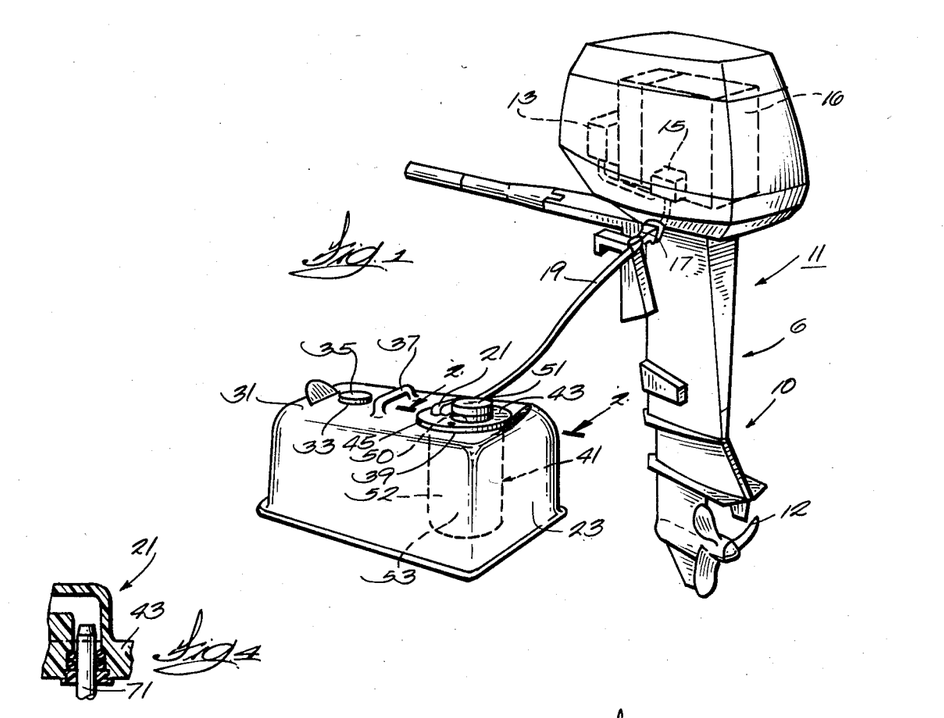
FIG. 1 is a perspective view of a marine propulsion installation embodying various of the features of the invention.
FIG. 4 is a fragmentary sectional view taken along line 4—4 of FIG. 3.

Shown in FIG. 1 is a conventional outboard motor 11 which includes a propulsion unit 6 having a lower unit 10 supporting a propeller 12, and a powerhead including a two-stroke internal combustion engine 16. The engine 16 is operated on a suitable fuel-oil mixture and includes fuel feeding means in the form of a carburetor 13 which can be of conventional construction and which receives the fuel/oil mixture from a fuel/oil mixture pump 15 which is commonly powered by pulsating crankcase pressure. In turn, the fuel/oil mixture pump 15 communicates with a fitting 17 adapted to be releasably connected to a flexible fuel/oil mixture hose or line 19 which, in turn, at its outer end, includes a fitting which, in the past, has been adapted to be releasably connected to a fitting on a remote portable fuel tank into which both fuel and oil have been supplied and mixed. The fuel/oil mixture pump 15 has conventionally created sufficient pressure to lift the mixture from the fuel tank under normal circumstances when the fuel tank was located not too distantly from the outboard motor.

Figure 2:
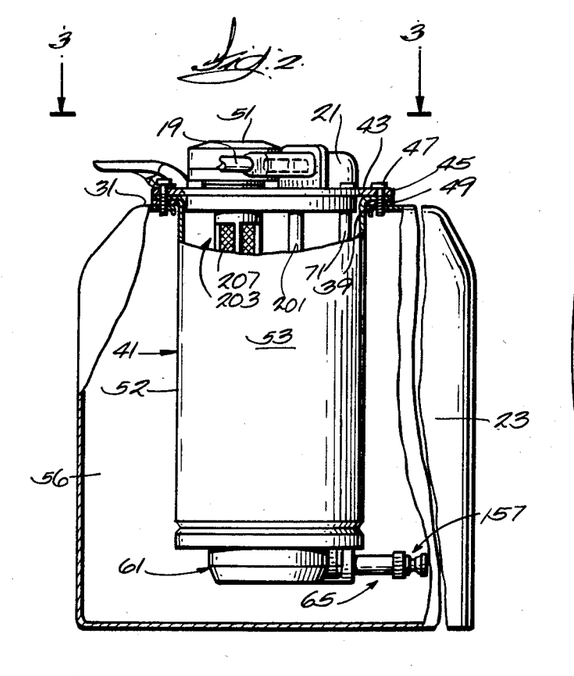
FIG. 2 is an enlarged view, partially broken away and in section, taken along line 2—2 of FIG. 1.
Figure 3:
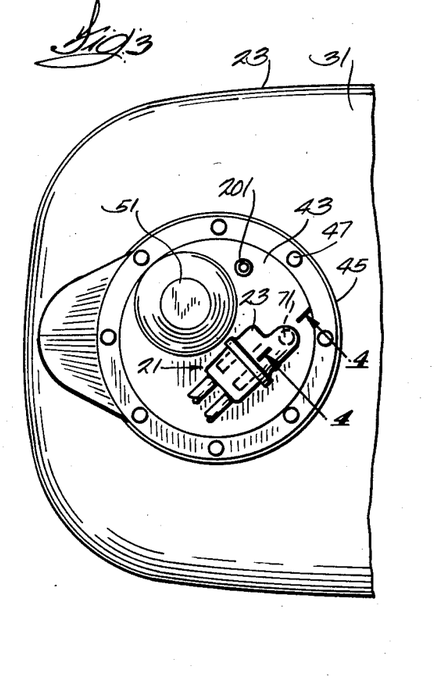
FIG. 3 is a fragmentary view taken along line 3—3 of FIG. 2.

Because of the desirability of insuring a proper ratio between the fuel and oil for a particular outboard motor and because of the economy of purchasing fuel and oil separately, as distinguished from "premix", the fuel line 19 is releasably connected to a fitting 21 on a tank 23 which embodies various of the features of the invention and which, as shown more fully in FIG. 2, includes separate reservoirs or compartments for each of fuel and oil, together with an oil pumping and fuel/oil mixing apparatus which is actuated by the suction of the fuel/oil pump 15 and which pumps oil into the outgoing fuel in the proper ratio which is "built-in".

More particularly, the tank 23 comprises a combined device for separately storing fuel and oil, and for pumping oil, and for supplying a fuel/oil mixture for operating the outboard motor 11. The tank 23 is constructed of metal and includes, in addition to bottom and side walls, a top wall 31 having a fuel filling or supply opening 33 which communicates with the interior of the tank and which is fabricated to removably receive a covering cap 35 having a closeable vent opening (not shown).

In addition, the top wall 31 of the tank 23 supports a the handle 37 which is welded or otherwise attached thereto, and includes a somewhat larger second opening 39 which is generally circular and which is located on the other side of the handle 37 from the fuel supply opening 33.

The larger or second opening 39 is closed by an oil storing, oil pumping, and fuel/oil mixing assembly 41. This assembly includes an upper wall 43 having an outer periphery 45 which is secured, as by suitable screws 47 and a gasket 49, to the margin around the periphery of the larger generally circular opening 39 in the top wall 31 of the portable tank 23. The upper wall 43 includes an oil filling or supply opening 50 which is configured to receive a covering cap 51 which can include a small vent opening (not shown).

Extending downwardly from the upper wall 43 is a circular or endless depending wall 52 which partially defines an oil reservoir 53. The bottom of the oil reservoir 53 is provided by a combined oil pumping and fuel/oil mixing device or assembly 61 which is suitably attached to the bottom of the depending wall 52, as for instance by screws or by crimping the bottom margin of the depending wall 52 around the circular periphery of the combined oil pumping and fuel/oil mixing device 61.

Figure 7:
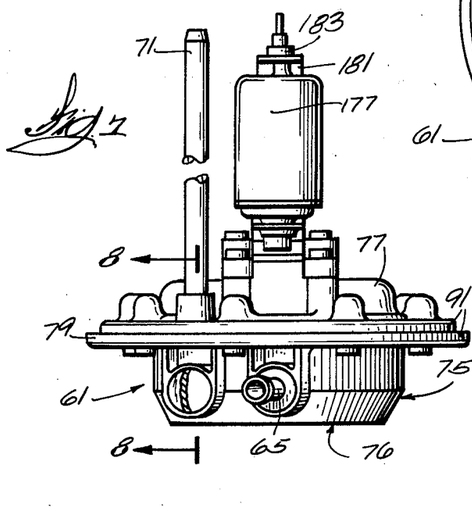
FIG. 7 is a side elevational view of the combined oil reservoir, oil pump, and fuel/oil mixing device shown in FIG. 5.
Figure 8:
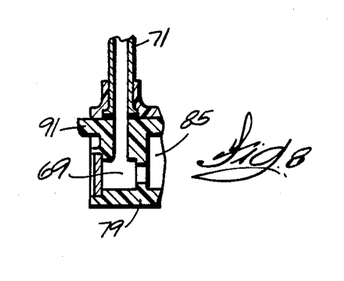
FIG. 8 is a sectional view taken along line 8—8 of FIG. 7.

The combined oil pumping and fuel/oil mixing device 61 includes (see FIG. 5) an oil inlet 63 which extends into and communicates with the oil reservoir 53, a fuel inlet 65 which communicates with the interior of the tank 23, which interior, apart from the oil reservoir 53, constitutes (see. FIG. 2) a fuel reservoir 56. In addition the oil pumping and fuel/oil mixing device 61 includes (see FIGS. 7 and 8), a fuel/oil mixture outlet 69 which communicates, through a conduit 71 extending through the oil reservoir 53, with the fitting 21 which is preferrably located on the upper wall 43 of the combined assembly 41, which is of conventional construction, and which is adapted to be releasably connected to the fuel hose 19.

While it is desirable that the fitting 21 be located, as shown and disclosed in the preferred construction, on the upper wall 43 of the combined assembly 41, at least some of the advantages of the invention can be obtained when the fitting 21 is located elsewhere on the tank 23.

More particularly, the combined oil pumping and fuel/oil mixing device 61 comprises (see especially FIG. 5) a main housing 75 including an upper inlet-side member 77, a lower outlet-side member 79, and a movable piston or wall 81 which is located between the members 77 and 79 and which divides the main housing 75 into an inlet chamber 83 adjacent the inlet-side member 77 and an outlet chamber 85 adjacent the outlet-side member 79, which inlet and outlet chambers 83 and 85 inversely vary in volume in response to movement of the movable wall or piston 81. Preferably and as shown in the drawings, the side members 77 and 79 respectively include peripheral flanges 91 which are secured to each other by screws 93 and the movable wall or piston 81 includes a flexible portion or diaphragm 95 which is peripherally sandwiched between the peripheral flanges 91 of the side members 77 and 79.

Figure 5:
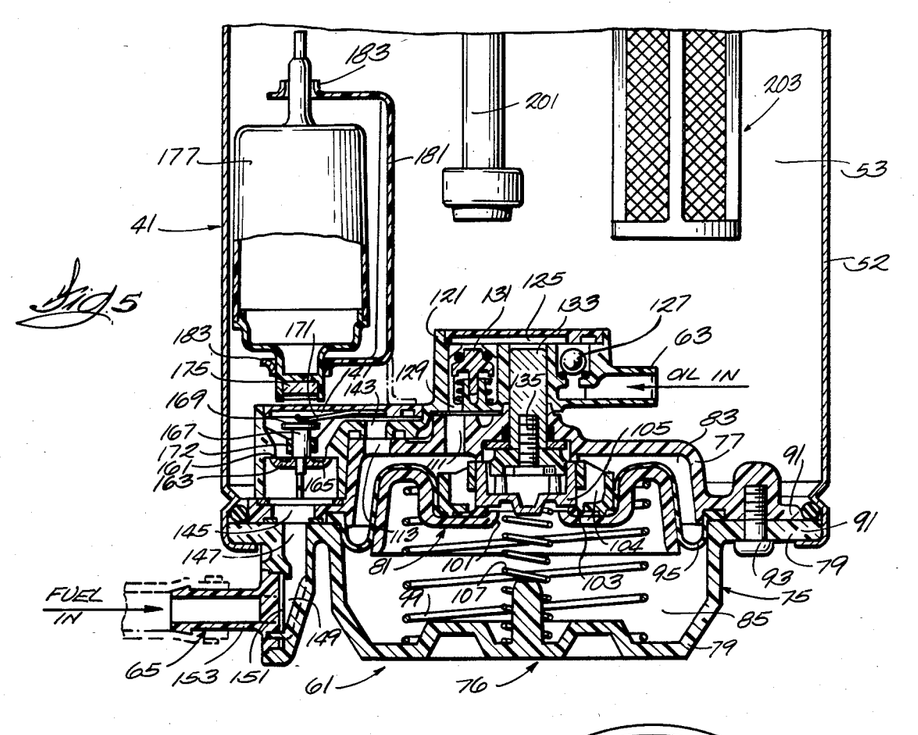
FIG. 5 is an enlarged view, partially in section, of a bottom portion of a combined oil reservoir, oil pump, and fuel/oil mixing device which incorporates various of the features of the invention and which is shown in FIG. 2.

The main housing also includes a main biasing spring 99 which bears between the outlet-side member 79 and the movable wall 81 and which yieldably biases the movable wall 81 in the direction minimizing the volume of the inlet chamber 83.

In addition, the movable wall 81 includes a centrally located port or passage 101 which communicates between the inlet and outlet chambers 83 and 85. The movable wall 81 also includes, on the upper surface thereof, a resilient member or valve seat 103 adjacent the port or passage 101. A valve guide member 104 is fixedly attached to the movable wall 81 for movement therewith. The valve guide member 104 secures both the valve seat 103 and the diaphragm 95 to the movable wall 81. Fluid flow through the port or passage 101 is controlled by a valve member 105 which is suitably supported for movement by the valve guide member 104 and which engages the valve seat 103 to close the port or passage 101 in response to movement of the movable wall or piston 81 to adjacent the inlet-side member 77, thereby minimizing the volume of the inlet chamber 83.

During subsequent downward movement of the movable wall 81 and until the movable wall 81 reaches or approaches the position minimizing the volume of the outlet chamber 85, the valve member 105 remains seated against the valve seat 103. When the movable wall reaches or approaches the position minimizing the volume of the outlet chamber 85, the valve member 105 is opened by a spring 107 which bears between the outlet-side member 79 and the valve member 105 and which retains the valve member 105 in the open position during movement of the wall 81 upwardly toward the position minimizing the volume of the inlet chamber 83. When the movable wall 81 reaches the position minimizing the volume of the inlet chamber 83, as already explained, the valve member 105 is returned to the closed position.

In order to facilitate mixing of the fuel and oil, the inlet-side member 77 includes an oil inlet port 111, and a fuel inlet port 113, both of which communicate with the inlet chamber 83. The outlet-side member 79 includes (see FIG. 8) the beforementioned fuel/oil mixture outlet 69 which communicates, through the outlet-side member 79 with the outlet chamber 85, and which, as previously explained, communicates with the conduit 71 which delivers the fuel/oil mixture to the fitting 21 on the upper wall 43 of the combined assembly 41.

Figure 6:
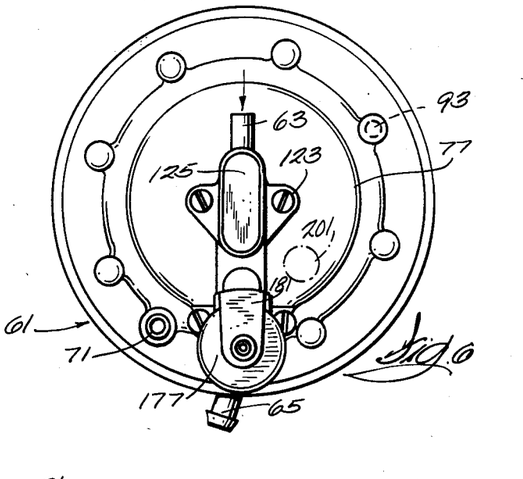
FIG. 6 is a top view of the oil pumping and fuel/oil mixing apparatus shown in FIG. 5.

The oil pumping and fuel/oil mixing device 61 also includes an oil pump housing 121 which is secured to the main housing 75 by suitable means, such as screws 123 (see FIG. 6), and which includes an oil pumping chamber 125 which communicates with the oil inlet 63 through a first check valve means 127 permitting flow from the oil inlet 63 to the oil pumping chamber 125 and preventing flow from the oil pumping chamber 125 to the oil inlet 63. The oil pumping chamber 125 also communicates with an oil delivery or outlet port 129 through a second check valve means 131 which permits flow from the oil pumping chamber 125 to the delivery port 129 and which prevents flow from the delivery port 129 to the oil pumping chamber 125, which oil delivery port 129 registers with and communicates with the oil inlet port 111 in the inlet-side member 77 when the oil pump housing 121 is assembled to the main housing 75.

Located in the oil pumping chamber 125 is an oil pumping piston member 133 which slideably extends through a suitable opening in the inlet-side member 77 and which is suitably fixed, as by a screw 135, to the valve guide member 104. Thus the oil pumping piston member 133 reciprocates with the valve guide member 104 which moves with the movable wall 81.

The oil pump housing 121 also includes a fuel inlet conduit 141 which has one end terminating in a fuel outlet port 143 which registers with and communicates with the fuel inlet port 113 in the inlet side member 77 when the oil pump housing 121 is assembled to the main housing 75.

The fuel inlet conduit 141 also includes a second end terminating in a fuel inlet port 145 registering with and communicating with a fuel transfer port 147 in the outlet-side member 79 of the main housing 75. In turn, the fuel transfer port 147 communicates through a duct 149 and through with a flapper valve 151 with an inlet fitting 153 which constitutes the beforementioned fuel inlet 65 and which communicates with the remainder of the tank interior which constitutes the fuel reservoir 56. If desired, and as shown in FIG. 2, the fuel inlet 65 can be attached to a filter assembly 157 which, in turn, communicates with the interior of the tank 23.

Located, in part, intermediate the ends of the fuel conduit 141 in the oil pump housing 121 is means for terminating fuel flow to the main housing 75 in the event the oil level in the oil reservoir 53 drops below a predetermined low level.

More particularly, while other constructions can be employed, in the disclosed construction, such fuel flow terminating means includes valve means comprising a valve seat 161 which faces downwardly and a valve member 163 which includes a disc-like part 165 which can be fabricated of flexible plastic and which is movable into and out of engagement with the valve seat 161. The valve member 163 also includes a central stem 167 which extends upwardly from the valve part 165 and through the valve seat 161, and which includes an upper enlarged head 169 which is fabricated of a metal which is attractable by a magnet.

The valve member 163 is biased to an open position spaced from the valve seat 161 by suitable spring means, such as the illustrated leaf spring 171 which is suitably fixed to the oil pump housing 121, and which bears on the enlarged head 169. Suitable means in the fuel conduit 141, such as a guide 172, can be employed to guide movement of the valve member 163 between its open and closed positions.

Means are provided for moving the valve member 163 to the closed position in response to a predetermined low oil level in the oil reservoir 53. While various arrangements can be employed, in the disclosed construction, such means comprises the beforementioned metallic head 169, together with a magnet 175 which is secured to the underside of a float 177 guided for travel relative to a position in which the magnet 175 attracts the valve head 169 to effect closure of the valve member 163 against the valve seat 161 when the float 177 is positioned in response to a low oil level.

The float 177 is guided for travel by a bracket 181 which is fixed to the oil pump housing 121 by suitable screws or the like, and which has suitable guide surfaces 183 engageable with the float 177 to guide float movement relative to the position which is effective to close the valve member 163 against the valve seat 161 when the first or predetermined low oil level is reached. As a consequence, fuel flow from the fuel reservoir 56 in the tank 23 will be discontinued when the low oil level is reached, thereby preventing operation of the outboard motor engine without lubricating oil.

Means are also provided for indicating approach of the oil level to the low oil level. While various arrangements can be employed, in the disclosed construction, an oil level indicator 201 extends through the upper wall 43 and into the oil reservoir 53. While various devices can be employed, in the preferred construction, the indicator 201 device is an optical device which, when viewed by a user, effectively changes color when the oil level drops below a second predetermined level higher than the first or predetermined low level. Thus, the operator is warned when to refill the oil reservoir 53 before the combined oil pumping and fuel/oil mixing device 61 is shut down by reason of closure of the valve 163 in the fuel inlet conduit 141.

Figure 9:
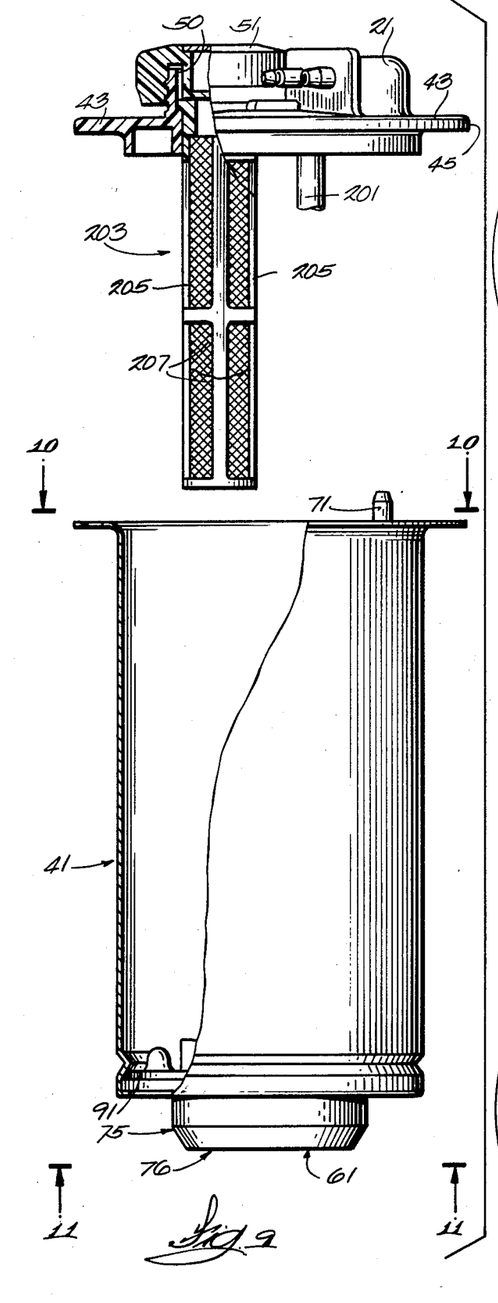
FIG. 9 is an exploded view of the combined oil reservoir, oil pump, and fuel/oil mixing device shown in FIG. 5.
Figure 10:
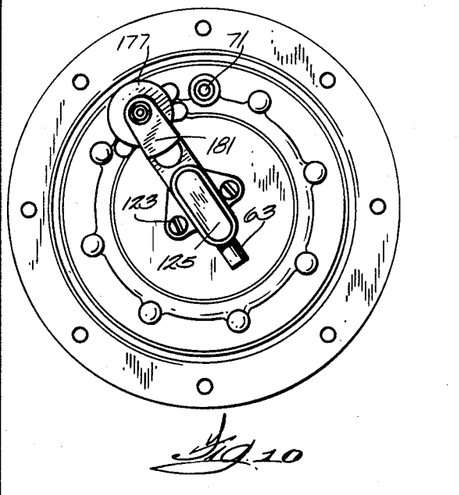
FIG. 10 is a view taken along line 10—10 of FIG. 9.
Figure 11:
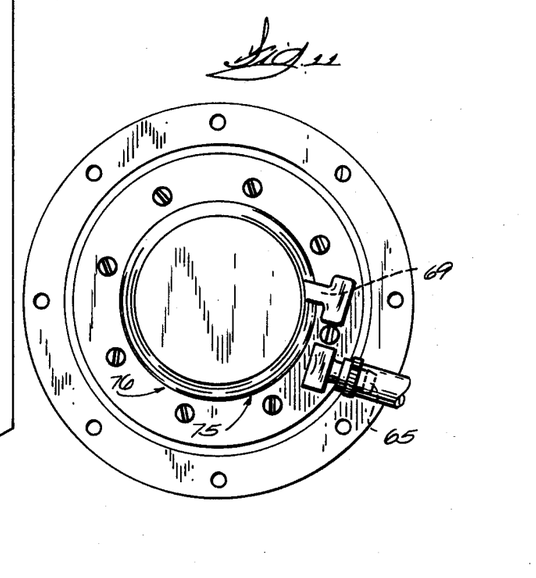
FIG. 11 is a view taken along line 11—11 of FIG. 9.

Also located in the oil reservoir 53, as best shown in FIGS. 2 and 9, is a an elongated oil filter 203 which is suspended from the oil filling opening 50 in the upper wall 43 and which includes an elongated cage of spaced supports 205 carrying a wire mesh filter screen 207. Thus, any oil supplied to the oil reservoir 53 through the opening 50 passes through the filter 203.

In operation, the suction created by the outboard motor fuel/oil mixture pump 15, acting through the fuel hose 19 and through the fuel/oil conduit 71, at the fuel-/oil mixture outlet 69 of the main housing 75, causes the mixed fuel and oil in the outlet chamber 85 to be lifted and then delivered to the carburetor 13. Such outflow from the outlet chamber 85 causes diminishment in the volume of the outlet chamber 85, thereby increasing the volume of the inlet chamber 83 and thereby causing inflow of fuel from the fuel inlet port 113. As the outlet chamber 85 reaches minimum volume, the spring 107 displaces the valve member 105 from the valve seat 103 and opens the passage 101. As a result, the wall or piston 81 is moved upwardly toward the inlet side member 77 by the main biasing spring 99, thereby maximizing the volume of the outlet chamber 85 and minimizing the volume of the inlet chamber 83, while at the same time, oil is pumped into the inlet chamber 83 from the oil pumping chamber 125, and the oil and fuel delivered to the inlet chamber 83 are mixed and flow through the passage or port 101 to the outlet chamber 85. When the inlet chamber 83 reaches its minimum volume, the valve member 105 is automatically seated on the valve seat 103 to close the port or passage 101 and the movable wall 81 again moves downwardly in the direction to minimize the volume of the outlet chamber 85 as the outboard motor fuel/oil mixture pump 15 calls for fuel-/oil mixture.

Movement of the movable wall 81 causes corresponding movement of the oil pumping piston member 133 in the oil pumping chamber 125, thereby supplying oil to the inlet chamber 83 in fixed predetermined relation to the amount of fuel passing through the main housing 75. Thus the engine is automatically supplied with a fuel/oil mixture of the proper ratio from the separate oil and fuel reservoirs 53 and 56, respectively contained in the tank 23 which is preferably portable, and which can be stationary.

In certain installations, as for instance, when using a small trolling outboard motor on a boat equipped with a stern drive unit which uses fuel unmixed with oil from a fuel tank, it is sometimes desirable to employ the combined oil reservoir, oil pumping, and fuel/oil mixing assembly independently of incorporation in a portable or stationary fuel tank.

Figure 12:
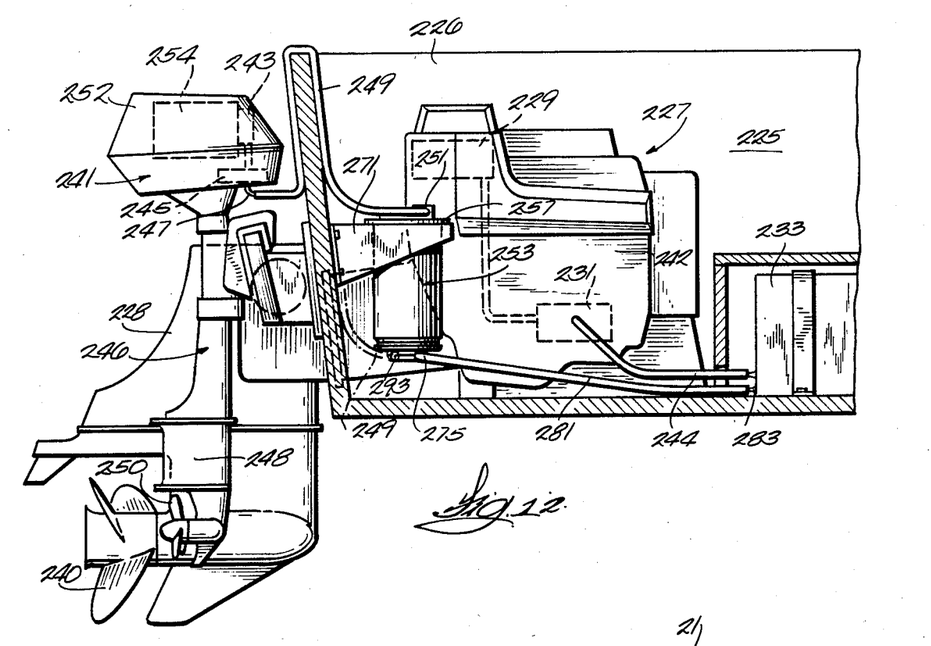
FIG. 12 is a fragmentary side elevational view, partially in section, of another marine propulsion installation including various of the features of the invention.

More specifically, shown in FIG. 12 is a marine installation 225 including a boat having a hull 226 and a stern drive unit 227 which is supported by the boat hull 226 and which includes a lower unit 228 located exteriorily of the boat hull 226 and supporting a propeller 240, and a four-stroke internal combustion engine 242 located interiorily of the boat hull 226 and including fuel feeding means in the form of a carburetor 299 which is fed fuel unmixed with oil through a suitable fuel pump 231 which creates a suction to lift fuel from a remote fuel tank 233 through a conduit 244.

Figure 13:
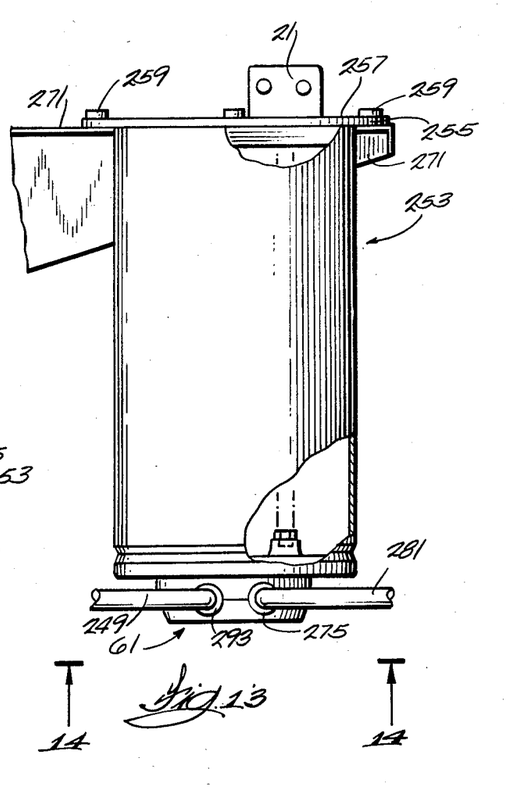
FIG. 13 is an enlarged fragmentary view, partially broken away and in section, of a portion of the installation shown in FIG. 12.

Also shown in FIG. 12 is a trolling outboard motor 241 which is located exteriorily of the boat hull 226 and which includes a propulsion unit 246 having a lower unit 248 supporting a propeller 250 and a powerhead 252 including a two-stroke internal combustion engine 254 including a fuel feeding device in the form of a carburetor 243 feeding a fuel/oil mixture to the engine. The carburetor 243 is supplied the fuel/oil mixture from a fuel/oil mixture pump 245 (preferably crankcase operated) which generates a suction and which, in turn, is connected through a fitting 247 with a flexible hose or fuel/oil mixture line 249. In turn, the hose or line 249 is connected to a fitting 251 on a combined oil reservoir, oil pumping and fuel/oil mixing assembly 253 (see FIGS. 12 and 13) which is constructed essentially as already described with respect to the combined assembly 41, except that the outer margin 255 of the upper wall 257 is secured by means of screws 259 or the like to a suitable bracket 271 which is suitably fixed to the boat hull 226. In turn, the fuel inlet 275 of the combined oil reservoir, oil pump, and fuel/oil mixing assembly 253 is suitably connected to a flexible hose 281 which, in turn, can be connected to a fitting 283 on the fuel tank 233 to enable the outboard motor fuel/oil mixture pump 245 to pump fuel from the fuel tank 233, through the combined oil reservoir, oil pumping and fuel/oil mixing assembly 253 for delivery to the outboard motor carburetor 243.

Figure 14:
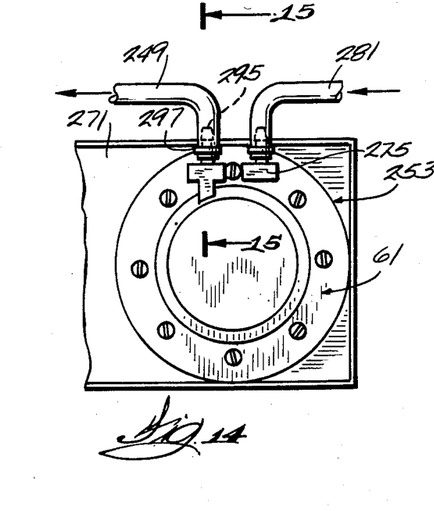
FIG. 14 is a view taken along line 14—14 of FIG. 13.
Figure 15:
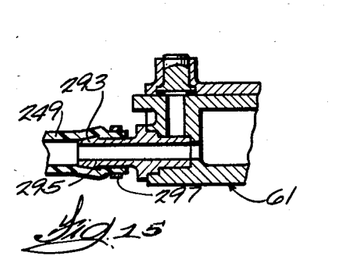
FIG. 15 is a sectional view taken along line 15—15 in FIG. 14.

As already indicated, the fuel/oil mixture supply hose 249 can be connected to the combined oil reservoir, oil pumping and fuel/oil mixing assembly 253 by means of a fitting 251, on the upper wall 257 of the combined assembly 253. Alternately, if desired, the fuel/oil mixture discharge arrangement from the outlet chamber of the main housing can be arranged so that the previously described conduit 71 is omitted, so that the connection of the conduit 71 to the outlet is plugged, and so that the outlet is provided with a suitable fitting 293, permitting attachment of the fuel/oil hose 249 to the bottom of the combined assembly 253, rather than to the fitting 251 on the upper wall 257. If desired such a lower fitting 293 can comprise (see FIGS. 14 and 15) a hollow male prong 295 which projects into the end of the line or hose 249 and to which a screw-operated tightening strap 297 is attached to prevent disconnection and to prevent leakage from between the prong 295 and the hose 249. Thus, in this embodiment, the combined oil reservoir, oil pump and fuel/oil mixing assembly 253 is employed with a remote separate fuel tank 233 otherwise usable with other equipment.

Various of the features of the invention are set forth in the following claims.

We claim:

1. A marine installation comprising a marine propulsion device including a propulsion unit having a lower unit supporting a propeller and a powerhead including a two-stroke internal combustion engine having means for feeding a fuel/oil mixture to said engine and including a fuel/oil mixture pump having an inlet and being operable to create suction at said inlet, a flexible hose releasably connected to and communicating with said inlet of said fuel/oil mixture pump, and a remote tank having an interior providing a fuel reservoir, having a fitting releasably connected to said flexible hose, having a top wall including a first opening which is adapted to afford filling of fuel into said interior of said tank and which is adapted to removably receive a cap covering said first opening, and a second opening spaced from said first opening, and having an oil storing, oil pumping and fuel/oil mixing device located in said tank and including an upper wall closing said second opening and being secured to said top wall of said tank, and having therein an opening which is adapted to afford filling of oil into said oil storing, oil pumping, and fuel/oil mixing device and which is adapted to removably receive a cap covering said opening in said upper wall, an endless wall depending into said tank from said upper wall to partially define an oil reservoir communicating with said upper wall opening, and an oil pumping and fuel/oil mixing apparatus secured to said depending wall to form the bottom of said oil reservoir and including a first inlet communicating with said oil reservoir, a second inlet communicating with said fuel reservoir, and an outlet communicating with said fitting.

2. A marine installation in accordance with claim 1 wherein said oil pumping and fuel/oil mixing apparatus includes a housing assembly comprising an inlet-side member, an outlet-side member, and a movable piston located between said inlet-side member and said outlet-side member and dividing said housing assembly into an inlet chamber and an outlet chamber.

3. A marine installation in accordance with claim 2 wherein said inlet-side member includes therein a fuel inlet port communicating with said inlet chamber, and an oil inlet port communicating with said inlet chamber, and wherein said outlet-side member includes said outlet.

4. A marine installation in accordance with claim 3 wherein said housing assembly further includes an oil pump housing secured to said inlet-side member and including an oil pumping chamber communicating with said first inlet, first check valve means permitting flow from said first inlet to said oil pumping chamber and preventing flow from said oil pumping chamber to said first inlet, an oil outlet port communicating with said oil inlet port in said inlet-side member, and second check valve means permitting flow from said oil pumping chamber to said oil outlet port and preventing flow from said oil outlet port to said oil pumping chamber.

5. A marine installation in accordance with claim 4 and further including an oil pumping piston extending slidably through said inlet-side member and into said oil pumping chamber in said oil pump housing, said pumping piston being operably associated with said movable piston for effecting reciprocation of said oil pumping piston in response to reciprocation of said movable piston.

6. A marine installation in accordance with claim 3 wherein said outlet-side member includes a first fuel conduit having a first end terminating in said second inlet and having a second end terminating in a fuel transfer port, and wherein said oil pump housing includes a second fuel conduit having a first end terminating in a fuel inlet port communicating with said fuel transfer port in said outlet-side member and having a second end terminating in a fuel outlet port communicating with said fuel inlet port in said inlet-side member.

7. A marine installation in accordance with claim 6 wherein said second fuel conduit includes therein, intermediate said fuel inlet port and said fuel outlet port thereof, a valve seat, and a valve member movable relative to said valve seat between opened and closed positions, and means for biasing said valve member to the closed position.

8. A marine installation in accordance with claim 1 wherein said second inlet includes valve means comprising a valve member normally located in an opened position and movable to a closed position, and means extending into said oil reservoir for displacing said valve member to the closed position in response to a predetermined low oil level in said oil reservoir.

9. A marine installation in accordance with claim 8 wherein said valve member is fabricated at least in part of metal, and wherein said means for displacing said valve member to the closed position comprises a float having a magnet, whereby when the oil level is at said predetermined level, said magnet attracts and displaces said valve member to the closed position.

10. A marine installation in accordance with claim 9 wherein said valve means includes a downwardly facing valve seat, and said valve member includes a flexible plastic valve part movable upwardly to the closed position in engagement with said valve seat.

11. A marine installation in accordance with claim 10 wherein said valve member includes a metallic portion attractable by said magnet when the oil is at said predetermined low level.

12. A marine installation in accordance with claim 1 wherein said fitting is located on said upper wall, and further including a conduit between said outlet and said fitting.

13. A marine installation in accordance with claim 12 wherein said conduit extends within said oil reservoir.

14. A marine installation comprising a boat hull, a stern drive unit supported by said boat hull and including a lower unit located exteriorly of said boat hull and supporting a propeller, and a four-stroke internal combustion engine located interiorly of said boat hull and including means for feeding fuel to said four-stroke engine and including a fuel pump operable to create suction, a remote fuel tank located in said boat hull and having an interior providing a fuel reservoir communicating with said fuel pump, an outboard motor located exteriorly of said boat hull and including a propulsion unit having a lower unit supporting a propeller and a powerhead including a two-stroke internal combustion engine including means for feeding a fuel/oil mixture to said two-stroke engine and including a fuel/oil mixture pump operable to create suction, and an oil storing, oil pumping and fuel/oil mixing device supported on said boat hull in spaced relation from said remote fuel tank and including an upper wall having therein an opening which is adapted to afford filling of oil into said oil storing, oil pumping, and fuel/oil mixing device and which is adapted to removably receive a cap covering said opening in said upper wall, an endless wall depending from said upper wall to partially define an oil reservoir communicating with said upper wall opening, and an oil pumping and fuel/oil mixing apparatus secured to said depending wall to form the bottom of said oil reservoir and including a first inlet communicating with said oil reservoir, a second inlet communicating with said fuel reservoir, and an outlet communicating with said fuel/oil pump.

15. A marine installation in accordance with claim 14 wherein said oil pumping and fuel/oil mixing apparatus includes a housing assembly comprising an inlet-side member, an outlet-side member, and a movable piston located between said inlet-side member and said outlet-side member and dividing said housing assembly into an inlet chamber and an outlet chamber.

16. A marine installation in accordance with claim 15 wherein said inlet-side member includes therein a fuel inlet port communicating with said inlet chamber, and an oil inlet port communicating with said inlet chamber, and wherein said outlet-side member includes said outlet.

17. A marine installation in accordance with claim 16 wherein said housing assembly further includes an oil pump housing secured to said inlet-side member and including an oil pumping chamber communicating with said first inlet, first check valve means permitting flow from said first inlet to said oil pumping chamber and preventing flow from said oil pumping chamber to said first inlet, an oil outlet port communicating with said oil inlet port in said inlet-side member, and second check valve means permitting flow from said oil pumping chamber to said oil outlet port and preventing flow from said oil outlet port to said oil pumping chamber.

18. A marine installation in accordance with claim 17 and further including an oil pumping piston extending slidably through said inlet-side member and into said oil pumping chamber in said oil pump housing, said pumping piston being operably associated with said movable piston for effecting reciprocation of said oil pumping piston in response to reciprocation of said movable piston.

19. A marine installation in accordance with claim 16 wherein said outlet-side member includes a first fuel conduit having a first end terminating in said second inlet and having a second end terminating in a fuel transfer port, and wherein said oil pump housing includes a second fuel conduit having a first end terminating in a fuel inlet port communicating with said fuel transfer port in said outlet-side member and having a second end terminating in a fuel outlet port communicating with said fuel inlet port in said inlet-side member.

20. A marine installation in accordance with claim 19 wherein said second fuel conduit includes therein, intermediate said fuel inlet port and said fuel outlet port, a valve seat, and a valve member movable relative to said valve seat between opened and closed positions, and means for biasing said valve member to the closed position.

21. A marine installation in accordance with claim 14 wherein said second inlet includes valve means comprising a valve member normally located in an opened position and movable to a closed position, and means extending into said oil reservoir for displacing said valve member to the closed position in response to a predetermined low oil level in said oil reservoir.

22. A marine installation in accordance with claim 21 wherein said valve member is fabricated at least in part of metal, and wherein said means for displacing said valve member to the closed position comprises a float having a magnet, whereby when the oil level is at said predetermined level, said magnet attracts and displaces said valve member to the closed position.

23. A marine installation in accordance with claim 22 wherein said valve means includes a downwardly facing valve seat, and said valve member includes a flexible plastic valve part movable upwardly to the closed position in engagement with said valve seat.

24. A marine installation in accordance with claim 23 wherein said valve member includes a metallic portion attractable by said magnet when the oil is at said predetermined low level.

25. A marine installation in accordance with claim 14 wherein said fitting is located on said upper wall, and further including a conduit between said outlet and said fitting.

26. A marine installation in accordance with claim 25 wherein said conduit extends within said oil reservoir.

27. A fuel feeding system comprising an assembly for separately storing fuel and oil, for pumping oil, and for mixing the fuel and oil, said assembly comprising a tank having an interior providing a fuel reservoir, and a top wall including a first opening which is adapted to afford filling of fuel into said interior of the tank and which is adapted to removably receive a cap covering said first opening, an oil storing, oil pumping, and fuel/oil mixing device located in said tank and including an upper wall closing said second opening and being secured to said top wall of said tank, and having therein an opening which is adapted to afford filling of oil into said oil storing, oil pumping and fuel/oil mixing device and which is adapted to removably receive a cap covering said opening in said upper wall, an endless wall depending into said tank from said upper wall to partially define an oil reservoir communicating with said upper wall opening, and an oil pumping and fuel/oil mixing apparatus secured to said depending wall to form the bottom of said oil reservoir and including a first inlet communicating with said oil reservoir, a second inlet communicating with said fuel reservoir, and an outlet, and means communicating with said outlet for generating a suction applied to said outlet.

28. A system in accordance with claim 27 wherein said oil pumping and fuel/oil mixing apparatus includes a housing assembly comprising an inlet-side member, an outlet-side member, and a movable piston located between said inlet-side member and said outlet-side member and dividing said housing assembly into an inlet chamber and an outlet chamber.

29. A system in accordance with claim 28 wherein said inlet-side member includes therein a fuel inlet port communicating with said inlet chamber and an oil inlet port communicating with said inlet chamber, and wherein said outlet-side member includes said outlet.

30. A system in accordance with claim 29 wherein said housing assembly further includes a oil pump housing secured to said inlet-side member and including an oil pumping chamber communicating with said first inlet, first check valve means permitting flow from said first inlet to said oil pumping chamber and preventing flow from said oil pumping chamber to said first inlet, an oil outlet port communicating with said oil inlet port in said inlet-side member, and second check valve means permitting flow from said oil pumping chamber to said oil outlet port and preventing flow from said oil outlet port to said oil pumping chamber.

31. A system in accordance with claim 30 and further including an oil pumping piston extending slidably through said inlet-side member and into said oil pumping chamber in said oil pump housing, said pumping piston being operably associated with said movable piston for effecting reciprocation of said oil pumping piston in response to reciprocation of said movable piston.

32. A system in accordance with claim 29 wherein said outlet-side member includes a first fuel conduit having a first end terminating in said inlet and having a second end terminating in a fuel transfer port, and wherein said oil pump housing includes a second fuel conduit having a first end terminating in a fuel inlet port communicating with said fuel transfer port in said outlet-side member and having a second end terminating in a fuel outlet port communicating with said fuel inlet port in said inlet-side member.

33. A system in accordance with claim 32 wherein said second fuel conduit includes therein, intermediate said fuel inlet port and said fuel outlet port, a valve seat, and a valve member movable relative to said valve seat between opened and closed positions, and means for biasing said valve member to the closed position.

34. A system in accordance with claim 27 wherein said second inlet includes valve means comprising a valve member normally located in an opened position and movable to a closed position, and means extending into said oil reservoir displacing said valve member to the closed position in response to a predetermined low oil level in said oil reservoir.

35. A system in accordance with claim 34 wherein said valve member is fabricated at least in part of metal, and wherein said means for displacing said valve member to the closed position comprises a float having a magnet, whereby when the oil level is at said predetermined level, said magnet attracts and displaces said valve member to the closed position.

36. A system in accordance with claim 35 wherein said valve means includes a downwardly facing valve seat, and said valve member includes a flexible plastic valve part movable upwardly to the closed position in engagement with said valve seat.

37. A system in accordance with claim 36 wherein said valve member includes a metallic portion attractable by said magnet when the oil is at said predetermined low level.

38. A system in accordance with claim 27 and further including a fitting located on said upper wall, a conduit between said outlet and said fitting, and a hose between said fitting and said means for generating a suction.

39. A system in accordance with claim 38 wherein said conduit extends within said oil reservoir.

40. An assembly for separately storing fuel and oil, for pumping oil, and for mixing the fuel and oil, said assembly comprising a tank having an interior providing a fuel reservoir, and further having a top wall including a first opening which is adapted to afford filling of fuel into said interior of said tank and which is adapted to removably receive a cap covering said first opening, and having a second opening spaced from said first opening, a fitting on said tank, and an oil storing, oil pumping, and fuel/oil mixing device located in said tank and including an upper wall closing said second opening and being secured to said top wall of said tank, and having therein an opening which is adapted to afford filling of oil into said oil storing, oil pumping, and fuel/oil mixing device and which is adapted to removably receive a cap covering said opening in said upper wall, an endless wall depending into said tank from said upper wall to partially define an oil reservoir communicating with said upper wall opening, and an oil pumping and fuel/oil mixing apparatus secured to said depending wall to form the bottom of said oil reservoir and including a first inlet communicating with said oil reservoir, a second inlet communicating with said fuel reservoir, and an outlet communicating with said fitting.

41. An assembly in accordance with claim 40 wherein said oil pumping and fuel/oil mixing apparatus includes a housing assembly comprising an inlet-side member, an outlet-side member, and a movable piston located between said inlet-side member and said outlet-side member and dividing said housing assembly into an inlet chamber and an outlet chamber.

42. An assembly in accordance with claim 41 wherein said inlet-side member includes therein a fuel inlet port communicating with said inlet chamber, and an oil inlet port communicating with said inlet chamber, and wherein said outlet-side member includes said outlet.

43. An assembly in accordance with claim 42 wherein said housing assembly further includes an oil pump housing secured to said inlet side member and including an oil pumping chamber communicating with said first inlet, first check valve means permitting flow from said first inlet to said oil pumping chamber and preventing flow from said oil pumping chamber to said first inlet, an oil outlet port communicating with said oil inlet port in said inlet-side member, and second check valve means permitting flow from said oil pumping chamber to said oil outlet port and preventing flow from said oil outlet port to said oil pumping chamber.

44. An assembly in accordance with claim 43 and further including an oil pumping piston extending slidably through said inlet-side member and into said oil pumping chamber in said oil pump housing, said pumping piston being operably associated with said movable piston for effecting reciprocation of said oil pumping piston in response to reciprocation of said movable piston.

45. An assembly in accordance with claim 42 wherein said outlet-side member includes a first fuel conduit having a first end terminating in said second inlet and having a second end terminating in a fuel transfer port, and wherein said oil pump housing includes a second fuel conduit having a first end terminating in a fuel inlet port communicating with said fuel transfer port in said outlet-side member, and having a second end terminating in a fuel outlet port communicating with said fuel inlet port in said inlet-side member.

46. An assembly in accordance with claim 45 wherein said second fuel conduit includes therein, intermediate said fuel inlet port and said fuel outlet port, a valve seat, and a valve member movable relative to said valve seat between opened and closed positions, and means for biasing said valve member to the closed position.

47. An assembly in accordance with claim 40 wherein said inlet includes valve means comprising a valve member normally located in an open position and movable to a closed position, and means extending into said oil reservoir and operable for displacing said valve member to the closed position in response to a predetermined low oil level in said reservoir.

48. An assembly in accordance with claim 47 wherein said valve member is fabricated at least in part of metal, and wherein said means for displacing said valve member to the closed position comprises a float having a magnet, whereby when the oil level is at said predetermined level, said magnet attracts and displaces said valve member to the closed position.

49. An assembly in accordance with claim 48 wherein said valve means includes a downwardly facing valve seat, and said valve member includes a flexible plastic valve part movable upwardly to the closed position in engagement with said valve seat.

50. An assembly in accordance with claim 49 wherein said valve member includes a metallic portion attractable by said magnet when the oil is at said predetermined low level.

51. An assembly in accordance with claim 40 wherein said fitting is located on said upper wall, and further including a conduit between said outlet and said fitting.

52. An assembly in accordance with claim 51 wherein said conduit extends within said oil reservoir.

53. An oil storing, oil pumping, and fuel/oil mixing device including an upper wall having therein an opening which is adapted to afford filling of oil into said oil storing, oil pumping, and fuel/oil mixing device and which is adapted to removably receive a cap covering said opening in said upper wall, an endless wall depending from said upper wall to partially define an oil reservoir communicating with said upper wall opening, and an oil pumping and fuel/oil mixing apparatus secured to said depending wall to form the bottom of said oil reservoir and including a first inlet communicating with said oil reservoir, a second inlet adapted to communicate with a fuel source, and an outlet for delivering the fuel/oil mixture.

54. An oil storing, oil pumping and fuel/oil mixing device in accordance with claim 53 wherein said oil pumping and fuel/oil mixing apparatus includes a housing assembly comprising an inlet-side member, an outlet-side member, and a movable piston located between said inlet-side member and said outlet-side member and dividing said housing assembly into an inlet chamber and an outlet chamber.

55. An oil storing, oil pumping and fuel/oil mixing device in accordance with claim 54 wherein said inlet-side member includes therein a fuel inlet port communicating with said inlet chamber, and an oil inlet port communicating with said inlet chamber, and wherein said outlet-side member includes said outlet.

56. An oil storing, oil pumping and fuel/oil mixing device in accordance with claim 55 wherein said housing assembly further includes an oil pump housing secured to said inlet-side member and including an oil pumping chamber communicating with said first inlet, first check valve means permitting flow from said first inlet to said oil pumping chamber and preventing flow from said oil pumping chamber to said first inlet, an oil outlet port communicating with said oil inlet port in said inlet-side member, and second check valve means permitting flow from said oil pumping chamber to said oil outlet port and preventing flow from said oil outlet port to said oil pumping chamber.

57. An oil storing, oil pumping and fuel oil mixing device in accordance with claim 56 and further including an oil pumping piston extending slidably through said inlet-side member and into said oil pumping chamber in said oil pump housing, said pumping piston being operably associated with said movable piston for effecting reciprocation of said oil pumping piston in response to reciprocation of said movable piston.

58. An oil storing, oil pumping and fuel/oil mixing device in accordance with claim 55 wherein said outlet-side member includes a first fuel conduit having a first end terminating in said second inlet and having a second end terminating in a transfer port and wherein said oil pump housing includes a second fuel conduit having a first end terminating in a fuel inlet port communicating with said fuel transfer port in said outlet-side member, and having a second end terminating in a fuel outlet port communicating with said fuel inlet port in said inlet-side member.

59. An oil storing, oil pumping and fuel/oil mixing device in accordance with claim 58 wherein said second fuel conduit includes therein, intermediate said fuel inlet port and said fuel outlet port, a valve seat, and a valve member movable relative to said valve seat between opened and closed positions, and means for biasing said valve member to the closed position.

60. An oil storing, oil pumping and fuel/oil mixing device in accordance with claim 53 wherein said second inlet includes valve means comprising a valve member normally located in an opened position and movable to a closed position, and means extending into said oil reservoir and operable for displacing said valve member to the closed position in response to a predetermined low oil level in said oil reservoir.

61. An oil storing, oil pumping and fuel/oil mixing device in accordance with claim 60 wherein said valve member is fabricated at least in part of metal, and wherein said means for displacing said valve member to the closed position comprises a float having a magnet, whereby when the oil level is at said predetermined level, said magnet attracts and displaces said valve member to the closed position.

62. An oil storing, oil pumping and fuel/oil mixing device in accordance with claim 61 wherein said valve means includes a downwardly facing valve seat, and said valve member includes a flexible plastic valve part movable upwardly to the closed position in engagement with said valve seat.

63. An oil storing, oil pumping and fuel/oil mixing device in accordance with claim 62 wherein said valve member includes a metalic portion attractable by said magnet when the oil is at said predetermined low level.

64. An oil storing, oil pumping and fuel/oil mixing device in accordance with claim 53 and further including a fitting located on said upper wall, and further including a conduit between said outlet and said fitting.

65. An oil storing, oil pumping and fuel/oil mixing device in accordance with claim 64 wherein said conduit extends within said oil reservoir.

* * * * *